US009889768B2

(12) United States Patent
Lussan (10) Patent No.: US 9,889,768 B2
(45) Date of Patent: Feb. 13, 2018

(54) DEVICE FOR ATTACHING A SEAT TO A VEHICLE STRUCTURE AND SEAT COMPRISING SUCH AN ATTACHMENT DEVICE (71) Applicant: EADS SOGERMA, Rochefort (FR)

(72) Inventor: Lionel Lussan, Echillais (FR)

( * ) Notice: Subject to any disclaimer, the term of this patent is extended or adjusted under 35 U.S.C. 154(b) by 497 days.

(21) Appl. No.: 14/359,684

(22) PCT Filed: Nov. 23, 2012

(86) PCT No.: PCT/EP2012/073487
§ 371 (c)(1),
(2) Date: Sep. 29, 2014

(87) PCT Pub. No.: WO2013/076255
PCT Pub. Date: May 30, 2013

(65) Prior Publication Data
US 2015/0035340 A1    Feb. 5, 2015

(30) Foreign Application Priority Data
Nov. 25, 2011    (FR) ...................... 1160811

(51) Int. Cl.
*B60N 2/005*    (2006.01)
*B64D 11/06*    (2006.01)
*B64D 25/04*    (2006.01)

(52) U.S. Cl.
CPC .............. *B60N 2/005* (2013.01); *B64D 11/06* (2013.01); *B64D 11/0619* (2014.12); *B64D 11/0696* (2013.01); *B64D 25/04* (2013.01)

(58) Field of Classification Search
CPC .... B60N 2/005; B64D 11/0619; B64D 11/06; B64D 11/0696; B64D 25/04
(Continued)

(56) References Cited

U.S. PATENT DOCUMENTS 6,334,643 B1 * 1/2002 Lindblad .............. B60N 2/4228
297/216.16 X
6,565,151 B2   5/2003 Jarnall et al.
(Continued)

FOREIGN PATENT DOCUMENTS

EP    1 190 944    3/2002
JP    H03 73737    7/1991
(Continued)

OTHER PUBLICATIONS

International Search Report dated May 7, 2013, corresponding to PCT/EP2012/073487.

*Primary Examiner* — Anthony D Barfield
(74) *Attorney, Agent, or Firm* — Young & Thompson (57) ABSTRACT A seat attached to a vehicle structure by at least four attachment points comprises, on at least one of the attachments an extendable connecting element (40) which transmits load between the main structure (11) of the seat and the structure of the vehicle, the extendable connecting element (40) including: —a first position in which a structure pin (62), which attaches the extendable connecting element (40) to the structure of the vehicle, is in a position close to a seat pin (64) that attaches the extendable connecting element (40) to the main structure (11) of the seat; a second position in which the structure pin (62) is in a position away from the seat pin (64) and in which the extendable connecting element (40) is able to transmit load between the structure pin (62) and the seat pin (64).

7 Claims, 4 Drawing Sheets (58) Field of Classification Search
USPC .................................. 297/216.16, 216.17
See application file for complete search history.

(56) References Cited

U.S. PATENT DOCUMENTS

| | | | | |
|---|---|---|---|---|
| 8,714,642 B2 * | 5/2014 | Lamparter | ............... | B60N 2/24 |
| | | | | 297/216.16 |
| 2002/0033622 A1 | 3/2002 | Jarnall et al. | | |
| 2003/0213885 A1* | 11/2003 | Schumann | ........... | B60N 2/1615 |
| | | | | 248/419 |

FOREIGN PATENT DOCUMENTS

| | | |
|---|---|---|
| WO | 97/28983 | 8/1997 |
| WO | 2006/124555 | 11/2006 |
| WO | 2011/140055 | 11/2011 |

* cited by examiner

DEVICE FOR ATTACHING A SEAT TO A VEHICLE STRUCTURE AND SEAT COMPRISING SUCH AN ATTACHMENT DEVICE

The invention belongs to the field of seats that must be used aboard travel vehicles.

More particularly, the invention relates to a seat equipped with a device for attaching the seat to the structure of a vehicle, such as an aircraft floor, which is subject to deformations.

For the transport of individuals aboard vehicles, the individuals—passengers or other personnel—are most often settled on seats.

In the case of, for example, aircraft or land vehicles, trains, or tour buses, the seats must ensure the safety of the individuals in case of impacts while ensuring the restraint of the occupant of the seat.

This restraint necessitates not only that the occupant of the seat be himself restrained on his seat but also that the structure of the seat withstand impact and that the seat itself does not become detached from the structure of the vehicle, in particular at the site of the attachments that make it integral with this structure.

In most categories of vehicles, standards are promulgated that define the stresses to which the seats are able to be subjected and which the seats must withstand to ensure the restraint of the passenger and of the seat in its position.

Such standards, such as, for example, the CS and FAR standards published by authorities certifying aircraft, define, on the one hand, the accelerations to which a passenger can be subjected under the critical conditions in case of a crash, but also impose constraints for demonstrating the conformity of the seats to the requirements of the standards.

Among the constraints imposed on aircraft seats in accordance with the standards in force, the seat must withstand—not only in the case of a corresponding acceleration—the case of a crash (16 g dynamic forward, 14 g dynamic backward) but further this strength must be ensured with a lateral twisting corresponding to a deformation of the structure of the aircraft to which the seat is attached.

It is therefore necessary that the structure of the seat occupied by a passenger and its attachments withstand the forces generated by the accelerations of the different cases of load considered after having been deformed because of the deformations of the structure of the vehicle.

These requirements are particularly constraining for the designer of seats.

In the aeronautics field, the document "Advisory Circular 25.562" presents in detail the conditions of the tests to which the seats must be subjected to satisfy the requirements of the standard.

Figure 1:
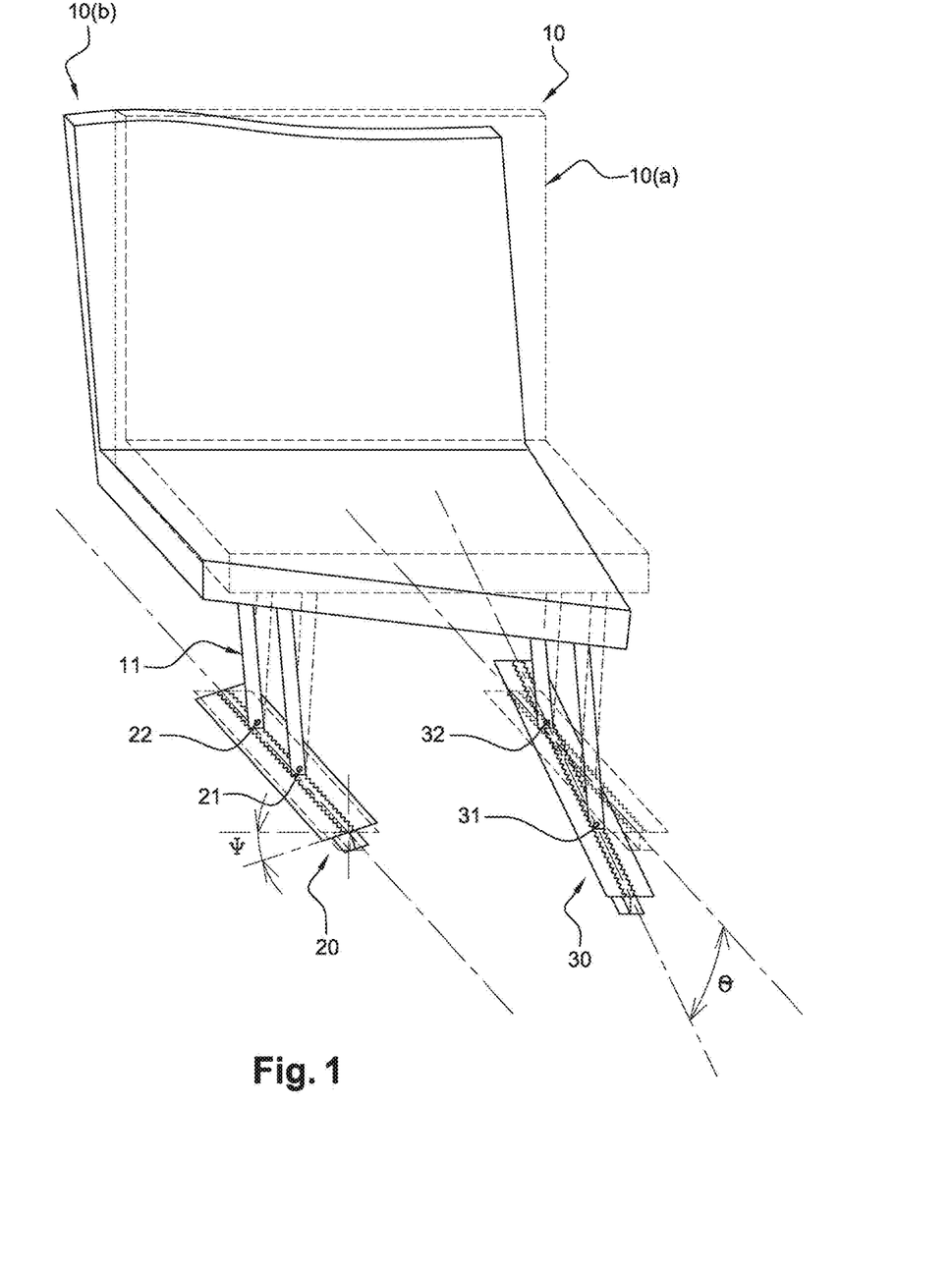
FIG. 1: a diagrammatic view of a seat attached to a floor before and after deformation of the structure of the floor according to the aeronautical standards of certification.

FIG. 1, drawn from this document, shows that for a seat 10 attached to two attachment lines 20, 30 at the level of the floor of the cabin of an airplane, it must be considered simultaneously—to represent the deformation of the structure of the airplane—that one of the attachment lines 20 is subjected to a twisting along a roll angle $\Psi$ around a longitudinal direction corresponding to the direction of movement of the vehicle and that the other attachment line 30 is deflected in the longitudinal vertical plane by a given pitch angle $\Theta$. This deformation is designated overall as a twisting of the structure.

As in the case illustrated in FIG. 1, the attachment lines on numerous models of aircraft are formed by attachment tracks that make it possible to adjust the position of the seats, attached by means of two attachments on each track per seat or seat unit, in a cabin as a function of the desired configuration of the cabin. In certain mountings, the attachments are directly joined to the structure of the aircraft without using a track.

FIG. 1 also illustrates the consequences of the twisting of the structure, of the floor in the case illustrated, on the deformation of the seat and of its structure by illustrating the seat in a normal shape 10(*a*) before twisting of the floor and deformed 10(*b*) after twisting of the floor.

A first solution generally used to meet the requirements of the standard consists in designing the structure of the seat so that the structure preserves the necessary strength after having undergone the deformations imposed by the twisting of the floor.

In this case, studies are necessary to take into account plastic deformations imposed on the structure of the seat and stiffnesses obtained after deformation as well as the behavior of the equipment fastened to the seats, for example comfort or safety equipment, which must not become detached during accelerations.

These studies prove costly to conduct because of their complexity and the validation tests that are generally necessary, and the seats thus designed are relatively heavy and complex, and therefore costly, to make.

Another solution that is easier to carry out consists in attaching the seat or the seat unit by three attachment points that makes it possible, by a mounting on fitted ball joints, to free the structure of the seat with regard to the deformations of the floor.

However, this solution has the drawback of requiring transferring higher forces to the site of each attachment and leads in practice to having to place in a cabin three attachment tracks where the most traditional solution requires only two of them.

This invention proposes attaching a seat to a structure of a vehicle by two lines having at least two attachments each without exhibiting the drawbacks of the prior art relative to the constraints imposed by the standards in case of deformation of the structures on which the seat is attached.

The seat, which can be a group of seats carried by the same structure, intended to be attached to the structure of a vehicle by at least four attachment points, is such that at least one of the attachment points has an extendable connecting element that ensures the transmission of forces between a primary structure of the seat and the structure of the vehicle when the seat is attached to said structure of the vehicle.

The extendable connecting element is characterized by:
  a first position in which a structure hinge pin, by which the extendable connecting element is attached to the structure of the vehicle when the seat is attached to the structure of the vehicle, is in a position that is close to a seat hinge pin, by which the extendable connecting element is attached to the primary structure of the seat;
  a second position in which the structure hinge pin is in a position distant from the seat hinge pin and in which the extendable connecting element is suitable for transmitting forces between the structure hinge pin and the seat hinge pin.

Thus, the primary structure of the seat is found connected to the structure of the vehicle by the attachment points as a whole despite a deformation of the structure of the vehicle that results in the displacement of one of the points of the structure at the site of an attachment point relative to the three other points, and in this situation, the forces, in particular a consequence of accelerations to which the vehicle is subjected, are transmitted from the seat to the structure by the attachments as a whole.

So that in the absence of deformation of the structure of the vehicle, the extendable connecting element in the first position transmits the forces between the primary structure of the seat and the structure of the vehicle, the extendable connecting element is held in the first position by a shear pin element. This shear pin element is destroyed in case of deformation of the structure of the vehicle by the forces resulting from this deformation given a sufficient rigidity of the primary structure of the seat so that the extendable connecting element is able to take the second position.

To ensure a form of irreversibility of the transitioning from the first position to the second position of the extendable connecting element, the extendable connecting element has a locking device in the second position when the extendable connecting element is in the second position. Thus, the extendable connecting element is able to transmit forces, particularly the acceleration forces in case of a crash, to this second position including in the case where these forces would have a tendency to bring the extendable connecting element back into the first position in the absence of locking in the second position.

In an embodiment, the extendable connecting element of the seat has a guiding groove of a plate that is attached hinged by the structure hinge pin, in which the seat hinge pin is guided, or else conversely of a plate that is attached hinged by the seat hinge pin and in the groove of which the structure hinge pin is guided.

Thus, the plate ensures the transfer of forces when the seat hinge pin and the structure hinge pin are locked in relation to the plate while being in abutment in the groove, for example toward an end of the groove, and/or while being attached to the plate.

To ensure the locking of the seat hinge pin or of the structure hinge pin that can be moved in the groove of the plate, for example, the groove has at least a second section extending a primary section so that in the second position of the extendable connecting element, the seat hinge pin or the structure hinge pin guided by the groove is locked by jamming of the plate on said seat hinge pin or said structure hinge pin in the second section.

In an embodiment, the groove has several secondary sections that determine different extension lengths of the extendable connecting element making it possible to ensure the transfer of forces for different values of deformation of the structure of the vehicle.

In another solution for ensuring the locking of the seat hinge pin or of the structure hinge pin that can be moved in the groove of the plate, the groove has at least one rack that works with a ratchet of the seat hinge pin, or a ratchet of the structure hinge pin along the moving hinge pin in the groove.

In another embodiment of the extendable connecting element, the extendable connecting element has a connecting rod that is attached hinged at a first end on the seat hinge pin and at a second end on the structure hinge pin, said connecting rod having primarily two link rods hinged to one another at the site of a connecting hinge pin, the link rods forming an angle in the first position of the extendable connecting element, the link rods being approximately aligned in the second position of the extendable connecting element so as to increase a distance between the seat hinge pin and the structure hinge pin relative to the first position.

Such a solution with hinged link rods makes it possible to produce an extendable connecting element with more compact dimensions in height and therefore that are less protruding above the structure of the vehicle, which makes it possible to offer installation advantages, particularly for the seats that have commercial applications.

To prevent the hinged connecting rod from folding back from the second position to the first position, the connecting rod has a device for locking the connecting rod when the link rods are in the second position.

In an embodiment of the device for locking the connecting rod, the locking device has a sliding nut arranged on one of the link rods when the extendable connecting element is in the first position and arranged in part on each one of the link rods when the extendable connecting element is in the second position so that the link rods are found locked in relation to one another.

The sliding nut is moved automatically when the link rods are approximately aligned by the action of a spring or of another elastic element that pushes the sliding nut onto a stop to lock the sliding nut in the desired position.

When a shear pin element is used to lock the extendable connecting element in the first position, the shear pin element is, for example, a cotter pin that passes through a hinge pin of the extendable connecting element that allows the extension of the extendable connecting element when said cotter pin has been sheared.

Such a cotter pin exhibits the advantage of determining by design in a precise way the level of effort that leads to the destruction of the cotter pin.

To take into account the possible different deformations of the structure of the vehicle on which the seat is attached, in particular the direction of the twisting dictated by the standards, the seat advantageously has an extendable connecting element on each one of the two attachments located farthest forward in relation to the seat or on each one of the two attachments located the farthest back in relation to the seat or else on each one of the two attachments located on the same side of the seat.

To ensure the release of the extendable connecting element, in particular the destruction of the shear pin element, when the structure of the vehicle is deformed, the necessary rigidity of the primary structure of the seat, in the case where it is not inherently sufficient, is ensured by an intermediate mounting plate for connecting the seat to the structure of the vehicle, the intermediate mounting plate incorporating all of the attachment devices, extendable or non-extendable, of the seat to the structure of the vehicle.

In this solution, the remainder of the primary structure of the seat that is also attached onto the intermediate mounting plate can be sized without taking into account the twisting requirements of the structure of the vehicle, for example a cabin floor.

This solution therefore also makes it possible to adapt existing seats to the current standards with fewer penalties, addressing the requirements of the standard before the conditions for deformation of the structure of the vehicle are applicable.

In particular, when the original structure of the seat is too rigid to bear deformations of the floor, the insertion of a mounting plate makes it possible to absorb the deformations of the floor without introducing stress into the structure of the seat and without damage from the transmitting of forces between the seat and the structure of the vehicle.

The invention also relates to an extendable connecting element for a seat of the invention.

Such an extendable connecting element for attaching a seat to a structure of a vehicle, such as an aircraft, comprises:

a structure hinge pin, by which the extendable connecting element is intended to be attached to a structure of a vehicle when the seat is attached to the structure of the vehicle;

a seat hinge pin by which the extendable connecting element is intended to be attached to a primary structure of the seat for which it is designed;

shear pin means holding the extendable connecting element in a first position in which the seat hinge pin and the structure hinge pin are in a position that is close;

locking means holding the extendable connecting element in a second position in which the seat hinge pin and the structure hinge pin are in a position that is distant in relation to the first position;

the connecting element being able in the second position to transmit forces between the seat hinge pin and the structure hinge pin.

The description of different embodiments of the invention is given with reference to the figures that represent.

A seat 10 has, on the one hand, a primary seat structure 11 and, on the other hand, a device for compensation of the deformations of a structure to which the seat is attached.

The term "seat" must, within the framework of this description, be understood in the broad sense as any equipment of a vehicle on which a transported individual is seated; in particular, seats of the seat type, of the armchair type or of the bench-seat type or grouping of several seats are included in the seats under consideration.

Other than evidence or indications to the contrary, when it will be a question of forces in the following description, it should be understood that it is a matter of the maximum forces in a load situation for which the seat must be designed and tested.

The seat 10 is attached, as shown in FIG. 1, to a structure of a vehicle, whose represented parts correspond to tracks 20, 30 that are part of the structure of a floor, by four attachment points 21, 22, 31, 32 of the seat that transmits the forces between the seat and the structure of the vehicle.

In the case shown, the structure is a floor, and this example, which will be used in the following description, is not limiting.

In a conventional way, the attachment points are distributed two 21, 22 on a right track 20 and two 31, 32 on a left track 30.

The attachment points are also offset in a longitudinal direction along a length of each track so as to determine a front attachment point 21, 31 and a rear attachment point 22, 32 for each track 20, 30.

The design and the structural sizing of the primary structure 11 of the seat will not be explained in detail here.

Such a design is within the scope of a person skilled in the art who designs seats for vehicles. The design of the primary structure 11 of the seat of the invention is further simplified because said primary structure is designed to withstand the forces due to the accelerations required by the standard applicable to said seat without it being necessary to consider the deformations of the structure on which the seat is attached, as will be understood from the detailed description of various embodiments of the invention.

The compensating device has at least one extendable connecting element 40 made so as to compensate for the deformation of the floor at the site of at least one attachment of the seat while ensuring the transmitting of forces between the primary structure 11 of the seat and the structure of the floor that is deformed after a twisting.

Here, it must be understood that the structure of the seat must withstand the forces connected to the accelerations of the crash situation, for example of an aircraft, after the structure of the vehicle, the aircraft in the example, has been deformed. The forces in question are transmitted from the seat, whose mass and that of its occupant are subjected to the accelerations, to the structure of the vehicle, traveling by way of the attachments, which ensure the holding of the seat to the structure of the vehicle.

Figure 2A:
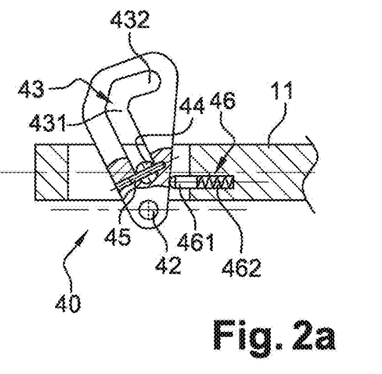
FIGS. 2a and 2b: a diagrammatic representation of a connecting element according to the invention at the site of an attachment between the structure of the seat and the structure supporting the seat, before deformation of the support structure, FIG. 2a, and after the deformation of the support structure, FIG. 2b.
Figure 2B:
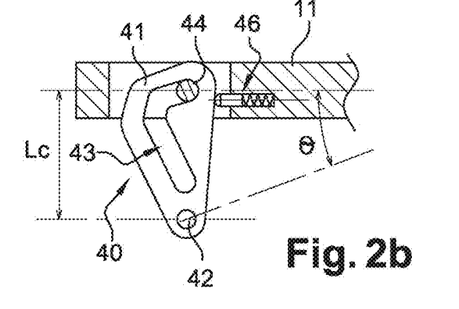

In a first embodiment shown in FIGS. 2a and 2b, the connecting element 40 has a plate 41, integral with a structure hinge pin 42 connected to the structure of the floor so as to make possible a movement of rotation of said plate around said structure hinge pin.

The plate 41 also has a groove 43 in which a seat hinge pin 44—for example a roller or a pad that is integral with the primary structure 11 of the seat—is moved, by sliding along said groove with minimum play.

In a first position, shown in FIG. 2a, in which the floor is not deformed, i.e., a nominal condition, the seat hinge pin 44 is found in a first position in abutment in the groove 43 at a lower end of said groove.

In this first position and in the configuration of the plate 41, the seat hinge pin 44 is found above the structure hinge pin 42 and in a position that is close to said structure hinge pin.

In a second position, shown in FIG. 2b, in which the structure of the floor is twisted in pitch by an angle Θ for which the structure hinge pin 42 has descended to the site of the attachment being considered in relation to the first position of FIG. 2a, the seat hinge pin 44 is found at an upper end of the groove 43 corresponding to the end of the groove that is opposite the lower end.

In this second position and in the configuration of the plate 41, the seat hinge pin 44 is found above the structure hinge pin 42 and in a position distant from said floor pin compared with the first solution.

Furthermore, the groove 43 has a first section 431, which is approximately straight from the lower end, whose length corresponds approximately to an extension length Lc, and has a second section 432 on the side of the upper end, said second section and the first section 431 forming an angle such that when the seat hinge pin 44 is located in the second section 432, a jamming is formed that prevents said seat hinge pin from moving in the direction of the lower end of the groove 43 under the effect of forces applied to the seat 10.

The extension length Lc corresponds approximately to the theoretical relative displacement between the seat hinge pin 44 and the structure hinge pin 42 during the application of the twisting of the floor and when the seat structure and the floor structure maintain their positions relative to the site of the three other attachment points.

It is understood that the seat hinge pin 44 is able to move in the groove 43 between the two ends of said groove despite the angle formed by the two sections 431, 432 because of the mounting of the plate 41 that can move in rotation around the structure hinge pin 42, it being understood that the orientation of said floor hinge pin allows the rotation of the plate in the plane of the groove 43, a plane defined by the two directions of the sections 431, 432.

Furthermore, the seat hinge pin 44 is locked in the first position in the groove 43 relative to the plate 41 by means of a shear pin element 45, such as a cotter pin going through the seat hinge pin 44 and the plate 41, a shear rupture of which frees the seat hinge pin 44 that becomes able to move in the groove 43.

Advantageously, a spring element 46 exerts on the plate 41 a force that tends to drive said plate in rotation around the structure hinge pin 42 in a direction facilitating the engagement and the holding of the seat hinge pin 44 in the second section 432 of the groove.

Such a spring element 46, for example as shown in FIGS. 2a and 2b, consists of a plunger 461 pushed against the plate 41 by a compression spring 462 and resting on the primary structure 11 of the seat.

The seat, in consideration of the first embodiment that has just been described, operates in the following manner for a seat 10 attached to the tracks 20, 30 of a floor structure by four attachment points 21, 22, 31, 32.

Figure 3A:
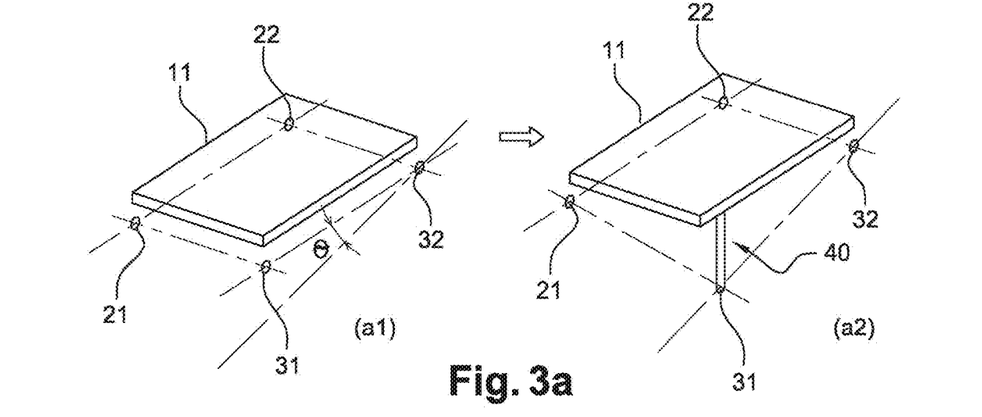
FIGS. 3a and 3b: an illustration of the operation of the seat in two cases of twisting, symmetrical in pitch, of the same line of attachments with a pitch down value Θ of the support structure, FIG. 3a, and with a pitch up value Θ of the support structure, FIG. 3b.

One of the attachment points, the left front attachment point 31 in the example shown in FIG. 3a, has an extendable connecting element 40.

The other attachment points 21, 22, and 32 are attached in a conventional way by means that are rigid in translation but that exhibit degrees of freedom in rotation, for example by means of ball joints, able to allow the angular deformations of the floor imposed by the case at issue.

In the example of aircraft, the standards in force provide that after deformation, one of the tracks, the right track 20 in the example illustrated, has undergone a roll rotation around its longitudinal axis by a roll angle Ψ of ten degrees (to the left or to the right), and that the other track, the left track 30 in the example, is inclined in pitch relative to the initial plane of the tracks by a pitch angle Θ also of ten degrees pitch down or pitch up, dipping around the rear attachment on the track that is being considered in the case shown.

Figure 3B:
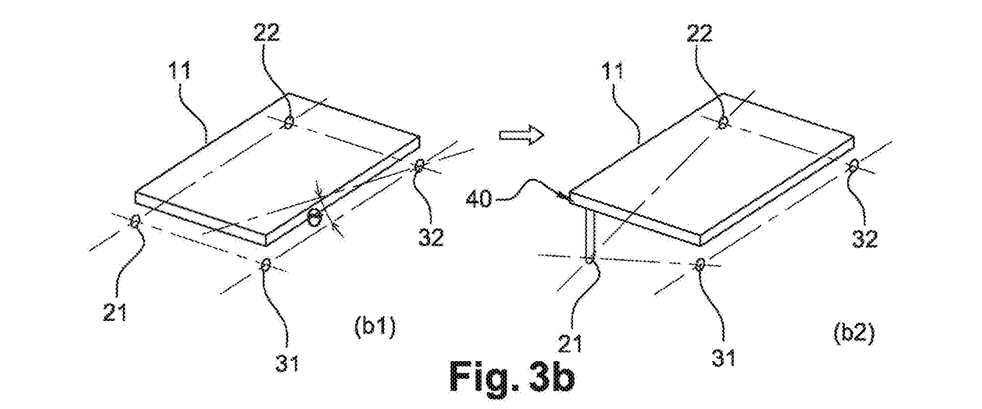

Regardless of the manner in which the deformations are distributed, the resulting layout in terms of relative displacement of the tracks and therefore of the attachment points is always equivalent to that shown in FIG. 3a before twisting of the floor, detail a1, and after twisting of the floor, detail a2, or to a configuration that is symmetrical relative to a vertical longitudinal plane of symmetry of the seat shown in FIG. 3b.

When the floor has not undergone any deformation, the seat hinge pin 44 is in abutment at the lower end of the groove 43. The shear pin element 45 holds the seat hinge pin 44 in this position provided that said shear pin element has not been destroyed. In practice, the shear pin element 45 is selected for not being destroyed for normal forces of using the seat 10 so that the associated attachment point comprising the connecting element 40 in the first position acts like a conventional attachment point and takes up a portion of the forces that must travel between the seat 10 and the floor.

During a deformation of the structure of the floor, and because of the rigidity of the primary structure 11 of the seat, the forces at the site of the attachment points exceed a predefined threshold value for which the shear pin element 45 is destroyed, freeing the seat hinge pin 44 that is then able to move in the groove 43. The angular displacement in down pitch Θ of the track 30 is shown at the site of the front attachment point 31 comprising the connecting element 40, in relation to the rear attachment point 32 located on the same side of the seat, by a relative lowering of the track and therefore of the plate 41 by an amplitude Lc.

During this lowering, the seat hinge pin 44 moves in the groove 43 toward the top of said groove in the direction of its upper end by following a trajectory imposed by the shape of said groove.

When the deformation corresponds to the pitch inclination of ten degrees of the track, the seat hinge pin 44 is found at the second section 432 of the groove in which it is engaged by the shape of the groove 43 and, if necessary, by the spring element 46 that causes the plate 41 to pivot around the structure hinge pin 42.

The sequence that has just been described corresponds to the release of the extendable connecting element.

When the seat hinge pin 44 is engaged in the second section 432 of the groove, it is held there by jamming of the plate 41 and by the spring element 46 that prevents an unwanted displacement of said plate, for example under the effect of local acceleration such as elastic returns during the deformation of the floor, and the plate 41 is able, by a suitable design of its structure, in the second position of the extendable connecting element 40, to transmit the forces in the same way as the other attachments of the seat, without the primary structure 11 of the seat having been deformed by the relative displacement of the attachments on the tracks 20, 30.

As in the case of the other attachments between the seat and the rails, the connection of the guiding plate to the floor is constructed to accept, without introducing twisting forces, angular deviations that are at least equal to those expected in rolling, here more or less ten degrees, for example by means of a connection by ball joint between the plate 41 and the structure hinge pin 42.

It should be noted that although the floor can be deformed in a different way, it is always possible to consider that three of the attachments form an isostatic system and remain connected to the floor without generating a deformation of the primary structure 11 of the seat, except for mounting the attachments by means of ball joint connections.

So as to take into account the symmetrical case in the case of floor deformation shown in FIG. 3a, i.e., the case shown in FIG. 3b, it is necessary to arrange at least a second extendable connecting element 40 on the seat 10, the first and second elements being distributed either on the attachments to the floor located on the same side of the seat, or located in the front of the seat as in the preferred arrangement of FIG. 3b for a seat oriented toward the main direction of acceleration in a crash situation, or located at the back.

Only the extendable connecting element pulled because of the twisting of the floor takes the second position whereas the one that is compressed remains in the first position.

In practice, a person skilled in the art will ensure in the arrangement of the extendable connecting elements that their shear pin elements do not trip under the acceleration forces connected with the different load cases of the attachments and that only one of the extendable elements is tripped in each of the envisaged floor twisting cases.

Figure 4:
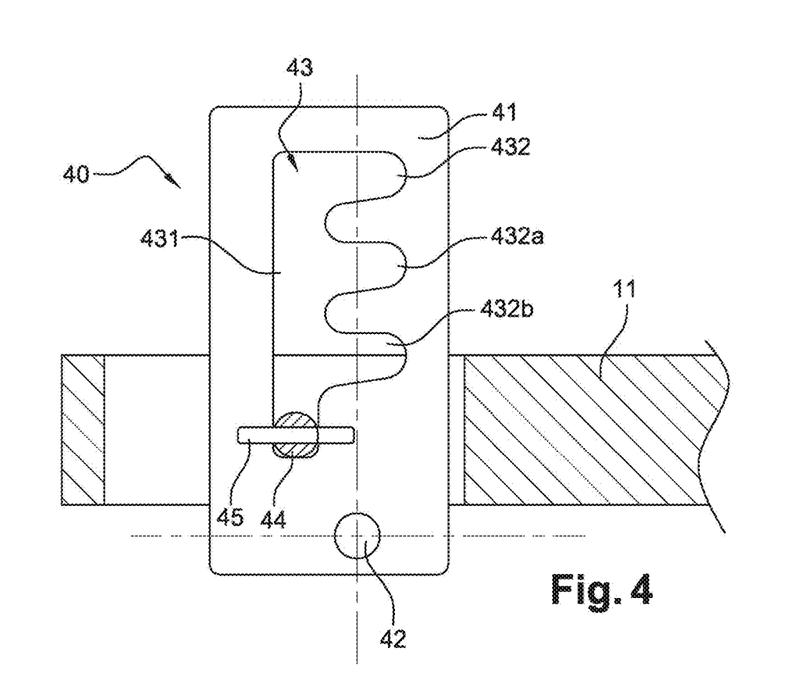
FIG. 4: a variant of the connecting element of the FIG. 2.

FIG. 4 shows a variant embodiment of the extendable connecting element 40 described in a first design.

In this variant, the groove 43 of the plate 41 has, in addition to the first approximately vertical section 431, a plurality of second sections 432, 432a, 432b that are offset in height in relation to one another so that the seat hinge pin 44 can be located in one or the other of the second sections as a function of the amplitude of the deformation of the support on which the seat 10 is attached. As in the case of the first embodiment described, the seat hinge pin is held by a shear pin element 45 apart from a sufficient deformation for tripping the operation of the extendable connecting element 40, and the seat hinge pin 44 is locked by jamming at the site of the second groove section in which it is engaged, optionally assisted by a spring element, not shown, that acts on the plate 41 and that rests on the primary structure 11 of the seat.

In this variant embodiment of the connecting element 40, the seat 10 is able to take a locked position for the shifting of forces to the floor for a different twisting value of the floor.

Figure 5:
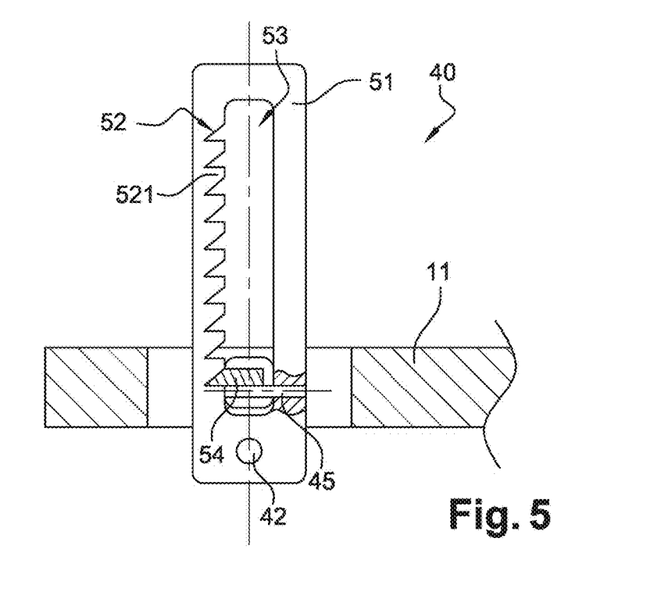
FIG. 5: an embodiment of a rack connecting element.

In another embodiment of the connecting element 40, a plate 51, attached to the structure of the floor on which the seat 10 is attached by the structure hinge pin 42, has an approximately vertical groove 53 that has a rack 52 on at least one of its edges.

The rack 52 has a plurality of teeth 521 that exhibit an asymmetrical profile to work with a seat hinge pin that has the shape of a ratchet 54 that is integral with the primary structure 11 of the seat.

The profile of the teeth 521 and the shape of the ratchet 54 make it possible, in combination with a degree of freedom in rotation of the plate 51 around the structure hinge pin 42, for said ratchet to slide easily toward the top of the rack 52 and in contrast to prevent the sliding of said ratchet toward the bottom of said rack.

Furthermore, the ratchet 54 is interlocked in an initial position with the plate 51 by a shear pin element 45, and the rack is applied against the ratchet as much as needed by a spring element, not shown in FIG. 5.

In this third embodiment of the connecting element 40, in a way similar to the second design, the seat 10 is able to take a locked position for the shifting of forces to the floor for a different twisting value of the floor.

In the three embodiments presented, it should be noted that a height of the connecting element 40 is contingent on the amplitude Lc of the relative displacement of the structure and of the seat at the site of the attachment point.

Figure 6A:
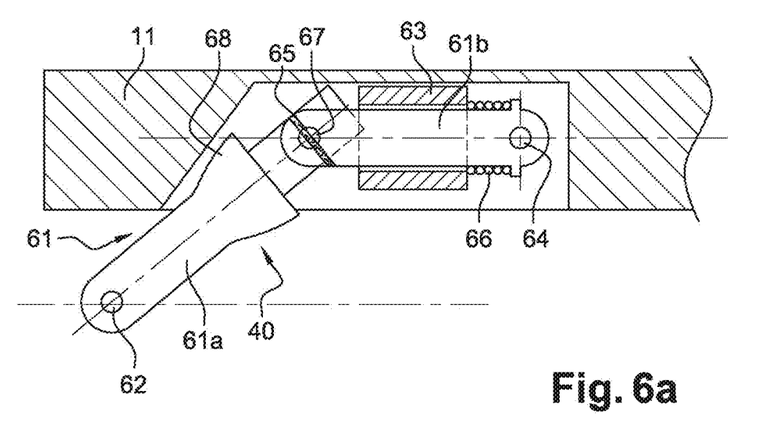
FIGS. 6a and 6b: an embodiment of the connecting element having a hinged connecting rod, in non-deformed support structure position, FIG. 6a, and in deformed support structure position, FIG. 6b.
Figure 6B:
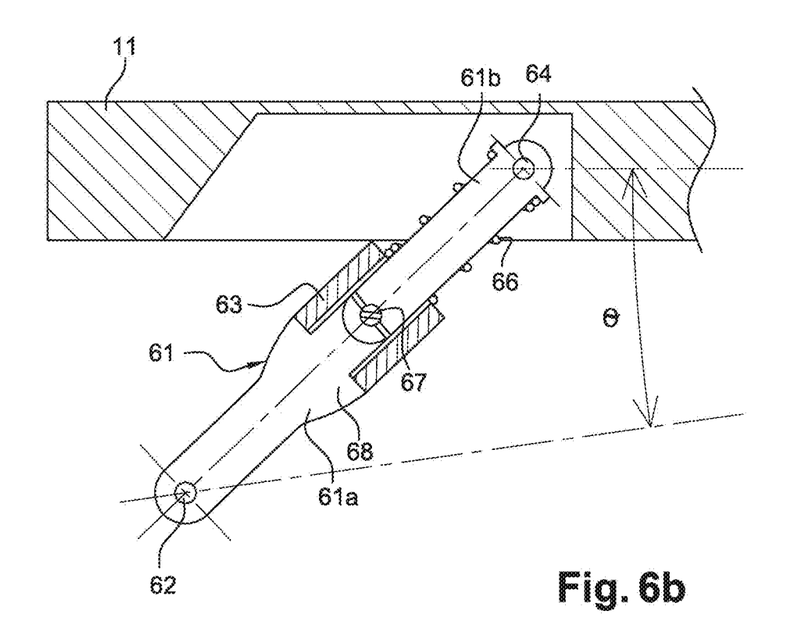

The embodiment of the extendable connecting element 40 presented in FIGS. 6a and 6b uses a connecting rod 61 in two hinged parts.

As shown, the connecting rod 61 has a lower link rod 61a and an upper link rod 61b.

The lower link rod 61a is hinged at a low end of the connecting rod 61 to the structure of the floor by a structure hinge pin 62.

The upper link rod 61b is hinged at an upper end of the connecting rod 61, opposite the low end of said connecting rod, to the primary structure 11 of the seat by a seat hinge pin 64.

The lower link rod 61a and the upper link rod 61b are hinged to one another by a junction hinge pin 67.

The structure hinge pin 62, the seat hinge pin 64 and the junction hinge pin 67 are also approximately parallel so that the connecting rod 61 is hinged in an approximately vertical plane.

In a first position, shown in FIG. 6a, corresponding to a lack of deformation of the floor, the lower link rod 61a and the upper link rod 61b form an angle at the site of the junction hinge pin 67.

In a second position, shown in FIG. 6b, corresponding to a deformation of the floor at a pitch with an angle $\Theta$ for which the structure hinge pin 42 has descended in relation to its initial position of FIG. 6a, the lower link rod 61a and the upper link rod 61b, on the one hand, are aligned and, on the other hand, are locked in this aligned position by a locking element 63 that prevents the rotation of the lower link rod 61a and the upper link rod 61b between one another at the site of the junction hinge pin 67.

Thus, as in the other embodiments described, the structure hinge pin and the seat hinge pin are in a position that is close in the first position and in a position that is distant in the second position because of the alignment of the link rods in this latter position.

The locking element 63 is, for example, a sliding nut that is located on a body of one of the link rods in the first position, for example the upper link rod 61b as shown in FIG. 6a, and that is located in part on the body of the upper link rod 6b and on a body of the lower link rod 6a in the second position so that it is no longer possible for the link rods to undergo a relative displacement in rotation around the junction hinge pin 67.

The sliding nut is associated with a locking spring element 66 that, when the link rods are in the second position, pushes the sliding nut against a stop 68 of the lower link rod 61a.

As in the case of the other embodiments described, it is preferred that the extendable connecting element 40 not be notably deformed under ordinary forces of operating the seat and be tripped only in the case of twisting of the structure of the floor on which the seat is attached.

This result is obtained by the locking of at least one of the hinges associated with the structure hinge pin 62, seat hinge pin 64 and junction hinge pin 67 by a shear pin means.

In the example shown in FIGS. 6a and 6b, the shear pin means is a cotter pin 65 that locks the hinge between the link rods at the site of the junction hinge pin 67 and that is sheared when the tensile forces on the ends of the connecting rod 61 exceed a predefined threshold.

In addition to the qualities of irreversibility of the extendable connecting element that makes it possible to achieve this embodiment, it is also possible to arrange said extendable connecting element in a space that is more restricted in height than the other embodiments described.

The seat of the invention and in particular the extendable connecting elements can be the object of a variant embodiment without jeopardizing the principle of the invention in particular to achieve the shear pin functions to free the extendable connecting element from the first, non-released position and/or to ensure a form of irreversibility of the movement between the first position and the second position under the effect of the forces that must be transmitted between the seat and the structure of the vehicle.

For example, the plate of the first three embodiments that are described can be attached to the primary structure of the seat and hinged at the site of the seat hinge pin, the structure hinge pin then being guided in the groove whose shape is suitable.

Thus, the extendable connecting elements 40, different embodiments of which are described, make it possible to produce a seat whose primary structure is attached to a structure, floor or the like, by at least four attachments and that can be made with a great rigidity without necessitating taking into consideration deformations of the structure to which the seat is attached.

By using an extendable connecting element 40 on at least two of the four attachments, for example the front attachments, and by a mounting on a ball joint of the attachment pins, the seat is attached rigidly to the structure of the vehicle in the various hypotheses of twisting of said structure of the vehicle.

Each extendable connecting element 40 is locked in a normal operating position by a shear pin element that frees the extension of the connecting element associated with the attachment point of the seat that is subjected to a sufficient force in the direction where the extendable connecting element assumes an extension.

The locking of the extendable connecting element in released position makes it possible for the attachment associated with said extendable connecting element to participate with the three other attachments in the resistance to forces in the load case that is being considered, without the primary structure of the seat having been notably deformed during the twisting of the structure on which the seat is attached.

In an example of embodiment of the seat 10 of the invention, the primary structure 11 of said seat has a relatively rigid intermediate mounting plate on which the extendable or conventional attachment elements are arranged connected to the structure of the vehicle.

The intermediate mounting plate guarantees by a sufficient rigidity that one of the extendable connecting elements will be tripped in case of sufficient twisting of the structure of the vehicle and this independently of the rigidity of the remainder of the primary structure of the seat that can exhibit a slighter rigidity.

The invention is also able to be used for seats that are not solely attached to the floor. For example, certain attachments can be joined to a side wall against which a seat is placed as the standard AC25-562, already cited, provides for it which illustrates this situation (FIG. 9-4 of version 1B of this standard dated Jan. 10, 2006). A person skilled in the art will without any particular difficulty adapt the principles presented in this case of installation of a seat.

The invention makes it possible to produce seats with a structure that is simpler to define and to manufacture that meet the standards of resistance to the crash forces of vehicles, in particular of aircraft, which require taking into account the deformations of the structures to which the seats are attached.

By a limited modification of characteristics of the extendable connecting elements, the same model of seat can be, without jeopardizing the definition of its structure, adapted to different conditions of deformation of the structure to which said seat is attached.

In particular, the invention makes it possible to attach a seat having a very rigid primary structure that has to be insulated from deformations of the structure to which the seat is attached.

The invention claimed is:

1. Seat intended to be attached to a structure of a vehicle by at least four attachment points wherein at least one of the attachment points has an extendable connecting element that ensures the transmission of forces between a primary structure of the seat and the structure of the vehicle when the seat is attached to said structure of the vehicle, which extendable connecting element has:
   a plate with a guiding groove connecting the structure of the vehicle and the structure of the seat;
   a structure hinge pin attached to the structure of the vehicle and connected to the plate;
   a seat hinge pin attached to the primary structure of the seat and connected to the plate;
      where the structure hinge pin is rotatably connected to the plate and the seat hinge pin is connected to the plate through the guiding groove in which said seat hinge pin is able to slide along or,
      where the structure hinge pin is connected to the plate through the guiding groove in which said structure hinge pin is able to slide along and the seat hinge pin is rotatably connected to the plate,
      and wherein the extending connecting element has at least two positions;
   a first position in which the structure hinge pin is in a position that is close to the seat hinge pin, and the seat or structure hinge pin which is connected to the plate through the guiding groove is held in said first position by a shear pin;
   a second position in which the structure hinge pin is in a position relatively distant from the seat hinge pin when compared to the close position, and the seat or structure hinge pin which is connected to the plate through the guiding groove has slid along the guiding groove and said second position is held by a locking device.

2. Seat according to claim 1, wherein the groove has at least a second section that extends a first section so that in the second position of the extendable connecting element, the seat hinge pin or the structure hinge pin guided by the groove is locked by jamming of the plate on said seat hinge pin or said structure hinge pin in said at least one second section.

3. Seat according to claim 1, wherein the shear pin element is a cotter pin that passes through a pin of the extendable connecting element.

4. Seat according to claim 1 having an extendable connecting element on each of two attachments located the farthest forward in relation to the seat among the at least four attachment points.

5. Seat according to claim 1 having an extendable connecting element on each of the attachments located the farthest back in relation to the seat among the at least four attachment points.

6. Seat according to claim 1 having an extendable connecting element on each of two attachments located on the same side, right or left, of the seat among the at least four attachment points.

7. Seat according to claim 1 having an intermediate mounting plate for connecting the seat to the structure of a vehicle, said intermediate mounting plate incorporating all of the attachment devices, extendable or non-extendable, of the seat to the structure of the vehicle, said mounting plate having a sufficient rigidity to trip an extension of an extendable connecting element in case of deformation of the structure of the vehicle when the seat is attached to such a vehicle structure.

* * * * *